United States Patent
Compton et al.

(10) Patent No.: US 10,168,943 B2
(45) Date of Patent: Jan. 1, 2019

(54) DETERMINING CORRECT DEVICES TO USE IN A MASS VOLUME MIGRATION ENVIRONMENT

(71) Applicant: INTERNATIONAL BUSINESS MACHINES CORPORATION, Armonk, NY (US)

(72) Inventors: Scott B. Compton, Hyde Park, NY (US); Dale F. Riedy, Poughkeepsie, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/288,055

(22) Filed: Oct. 7, 2016

(65) Prior Publication Data
US 2018/0101315 A1 Apr. 12, 2018

(51) Int. Cl.
G06F 3/06 (2006.01)
(52) U.S. Cl.
CPC .......... *G06F 3/0647* (2013.01); *G06F 3/0605* (2013.01); *G06F 3/067* (2013.01)
(58) Field of Classification Search
CPC .... G06F 3/0619; G06F 3/0635; G06F 3/0647; G06F 3/0665; G06F 3/0689
See application file for complete search history.

(56) References Cited

U.S. PATENT DOCUMENTS

| 5,369,750 A | * | 11/1994 | Inoue | G06F 12/0284 |
| | | | | 711/202 |
| 6,173,377 B1 | | 1/2001 | Yanai et al. | |
| 8,301,860 B2 | | 10/2012 | Cyr et al. | |
| 8,799,594 B2 | | 8/2014 | Broido et al. | |
| 2010/0235592 A1 | | 9/2010 | Kaneda et al. | |
| 2014/0143391 A1 | * | 5/2014 | Tanigawa | G06F 9/45558 |
| | | | | 709/221 |
| 2014/0143514 A1 | | 5/2014 | Kulkarni et al. | |
| 2015/0339071 A1 | | 11/2015 | Haustein et al. | |
| 2016/0026409 A1 | | 1/2016 | Tanaka et al. | |

* cited by examiner

*Primary Examiner* — Reginald G Bragdon
*Assistant Examiner* — Edward Wang
(74) *Attorney, Agent, or Firm* — Cantor Colburn LLP; William A. Kinnaman, Jr.

(57) ABSTRACT

A computer-implemented method for determining correct devices to use in a mass volume migration environment includes reading an I/O configuration definition for a plurality of devices in the mass volume migration environment and definition of a second set of the plurality of devices, wherein the plurality of devices comprise a first set of the plurality of devices. The method includes executing a migration and annotating the first set and the second set with status identifiers. The method also includes responsive to completing a migration of a device in the first set to the associated corresponding device in the second set, updating the annotation of the migrated device in the first set and the corresponding device in the second set and swapping the migrated device in the first set with the corresponding device in the second set, and continuing the migration of devices of the first set to the second set.

10 Claims, 6 Drawing Sheets

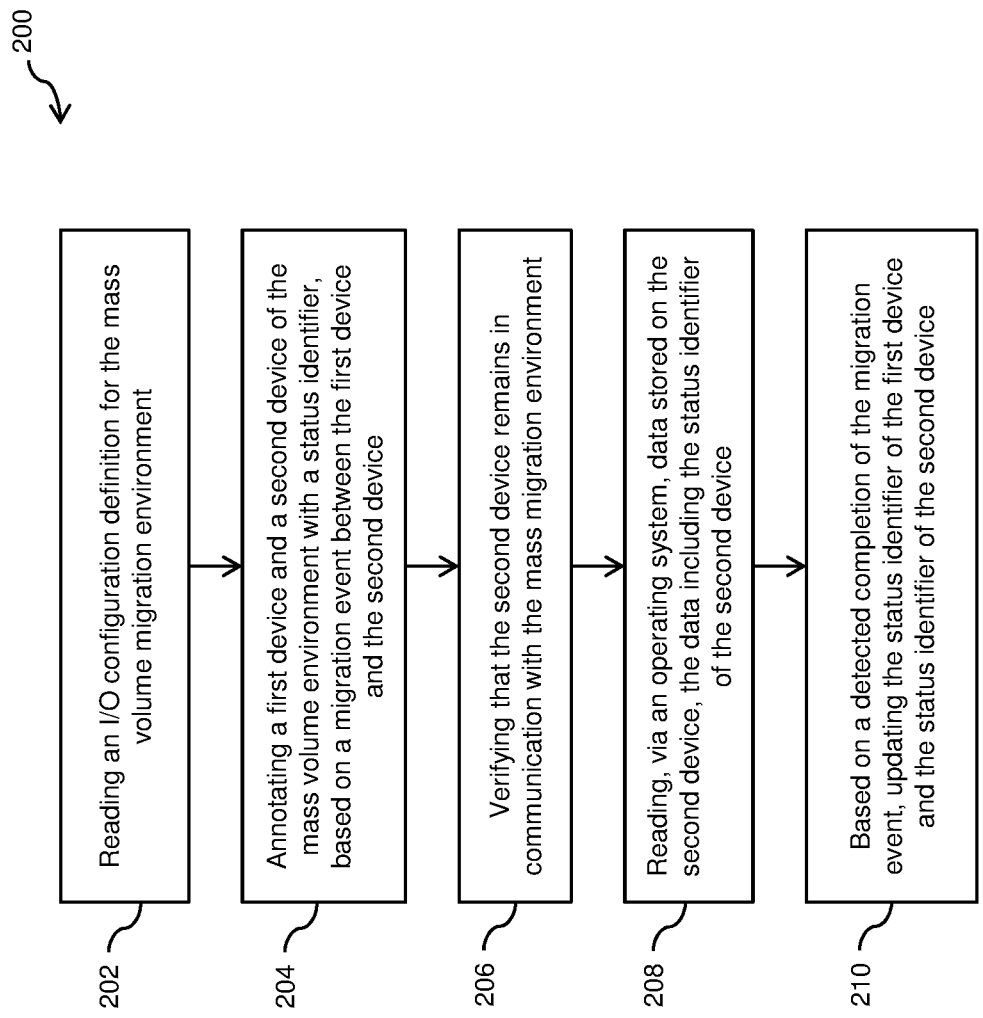

| Device 0.xxxx flagging | Device 1.xxxx flagging | Device brought online |
|---|---|---|
| Not flagged | Not flagged | 1.xxxx |
| "allow online" | "do not allow online" | 0.xxxx |
| "do not allow online" | "allow online" | 1.xxxx |
| "do not allow online" | "do not allow online" | Neither - error condition |
| "allow online" | "allow online" | Neither – error condition, devices boxed |

FIG. 5

DETERMINING CORRECT DEVICES TO USE IN A MASS VOLUME MIGRATION ENVIRONMENT

BACKGROUND

The present invention relates to device management during data and device migration, and more specifically, to determining correct devices to use in a mass volume migration environment.

Data and device migration is the process of transferring data between various storage types, formats, or computer systems. For example, migration can involve the transfer of data from devices on one storage controller to another storage controller. Provided that storage controllers today can have up to 256 defined logical control units, and up to 256 devices defined to each logical control unit for a total of 65,536 devices, moving data from one storage controller to another can be a complex task.

Device management during migration is critical in order to ensure the appropriate devices are operational and available online once they have completed the migration process. An application that attempts to access a device that is no longer available after migration will be unable to retrieve the requested data. There are many reasons that data migration will be performed such as for maintenance, equipment upgrades, new technology, different vendor and/or consolidation of data. After the migration has been completed, the I/O configuration can be modified to reflect the updated configuration of the system. Because data migration can occur at different speeds, challenges may arise when managing the I/O configuration changes required to reflect the completed migration.

SUMMARY

According to an embodiment of the present invention, a computer program product, a computer-implemented method, and a system for determining correct devices to use in a mass volume migration environment are provided. One or more embodiments include reading an I/O configuration definition for a plurality of devices in the mass volume migration environment, wherein the plurality of devices comprise a first set of the plurality of devices, and defining a second set of the plurality of devices, wherein each device of the first set is associated with a corresponding device in the second set. Another embodiment includes executing a migration from the first set to the second set, and annotating the first set of devices and the second set of devices with status identifiers. One or more embodiments include responsive to completing a migration of a device in the first set to the associated corresponding device in the second set, updating the annotation of the status identifier of the migrated device in the first set and the corresponding device in the second set and swapping the migrated device in the first set with the corresponding device in the second set, and continuing the migration of devices in the first set of devices to the second set of devices.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 2 illustrates a flow diagram in accordance with one or more embodiments of the invention;

FIG. 5 depicts a table in accordance with one or more embodiments of the invention.

DETAILED DESCRIPTION

Figure 1A:
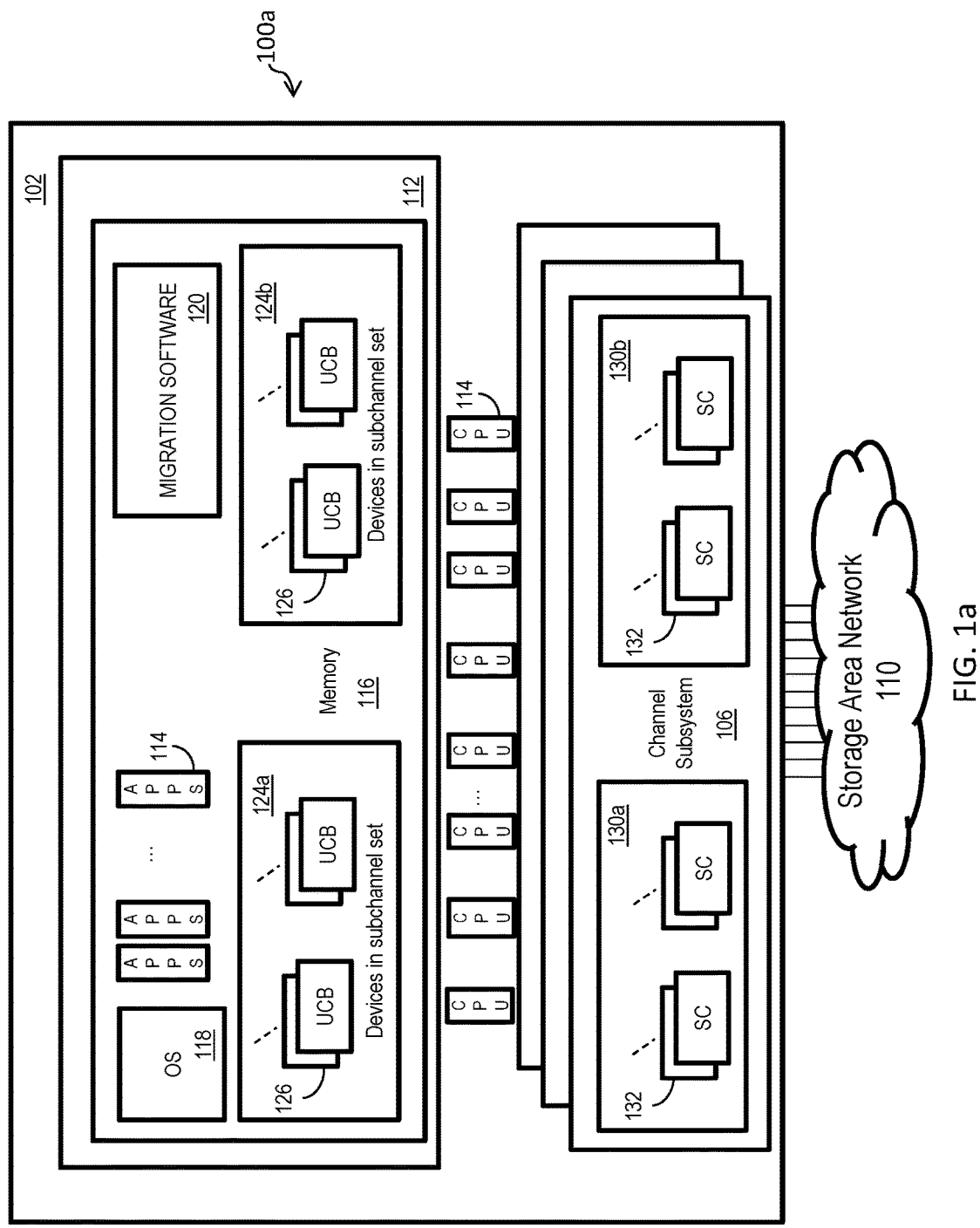
FIG. 1a and FIG. 1b are block diagrams illustrating one example of a processing system for practice of the teachings herein.

In accordance with embodiments of the disclosure, computer program products, computer-implemented methods, and systems for determining correct devices to use in a mass volume migration environment are provided.

In one or more embodiments, a computer program product for determining which devices to use in a mass volume migration environment is provided. The computer program product reads an I/O configuration definition for a plurality of devices in the mass volume migration environment, wherein the plurality of devices comprise a first set of the plurality of devices, and a second set of the plurality of devices and also includes the definition of a second set of the plurality of devices, wherein each device of the first (source) set is associated with a corresponding device in the second (target) set. The computer program product also includes executing a migration from the first set to the second set, and annotating the first set of devices and the second set of devices with status identifiers. The computer program product includes responsive to completing a migration of a device in the first set to the associated corresponding device in the second set, updating the annotation of the migrated device in the first set and the corresponding device in the second set and swapping the migrated device in the first set with the corresponding device in the second set, and continuing the migration of the devices of the first set of devices to the second set of devices.

In one or more embodiments, a computer-implemented method for determining which devices to use in a mass volume migration environment is provided. The computer-implemented method includes reading an I/O configuration definition for a plurality of devices in the mass volume migration environment, wherein the plurality of devices comprise a first set of the plurality of devices, and defining a second set of the plurality of devices, wherein each device of the first set is associated with a corresponding device in the second set. The computer-implemented method also includes executing a migration from the first set to the second set, and annotating the first set of devices and the second set of devices with status identifiers. The computer-implemented method includes responsive to completing a migration of a device in the first set to the associated corresponding device in the second set, updating the annotation of the migrated device in the first set and the corresponding device in the second set and swapping the migrated device in the first set with the corresponding device in the second set, and continuing the migration of the devices of the first set of devices to the second set of devices.

In one or more embodiments, a system for determining which devices to use in a mass volume migration environment is provided. The system includes reading an I/O configuration definition for a plurality of devices in the mass volume migration environment, wherein the plurality of devices comprise a first set of the plurality of devices, and defining a second set of the plurality of devices, wherein each device of the first set is associated with a corresponding device in the second set. The system also includes executing a migration from the first set to the second set, and annotating the first set of devices and the second set of devices with status identifiers. The system includes responsive to completing a migration of a device in the first set to the associated corresponding device in the second set, updating the annotation of the migrated device in the first set and the corresponding device in the second set and swapping the migrated device in the first set with the corresponding device in the second set, and continuing the migration of the devices of the first set of devices to the second set of devices.

Data migration can include a migration of a subset of data from a first location of a device to a second location of the same device or different device. In addition, the data migration can include translating the data from a first version or format to a different version or format. Device migration includes transferring the data from a source device to a destination device where the source device can be taken offline after the completion of the migration. After a subsequent initialization, the destination device will be brought online and available for normal operation. Device migration can also include migrating a device from a first set to a second set of devices being managed by the same device controller or a different device controller. The migration product and software described herein have the ability to annotate devices for a device migration in a manner that allows operating systems to recognize the annotation. In addition, operating systems can be updated and configured to access the annotated devices to determine whether the device should be brought online based on the annotation. Finally the operating systems allow a hybrid set of devices from different subchannel sets to accommodate various migration completion times. These features aid with the management of devices and the I/O configuration definitions during the migration of the devices. Prior to the start of mass migration, all of the devices selected for use are in the first subchannel set of devices, and upon completion of the mass migration, all of the devices selected for use are in the second subchannel set of devices. While migration is in progress, a mix of devices from each subchannel set can be selected for use.

Further, the techniques described can simplify the migration of tens of thousands of devices. Piecemeal migration of a large number of devices is tedious and prolongs the time the entire migration will be completed. In addition, after the completion of each migration, the I/O configuration must be updated to ensure that each future initial program load (IPL) will use the correct target device after migration. The initial program load refers to the loading of the operating system into the computer's main memory. An IPL can be executed after a change in the hardware configuration. When migrating a large number of devices, each device may complete the migration at different times potentially delaying those devices that have already completed the migration from coming online until the next IPL. One or more embodiments of the invention address the above device management challenges mentioned above.

The techniques described herein also address the limited capacity of a client. A limited number of devices are allowed to be online at one time and migration of the entire I/O configuration may not be possible without using alternate device numbering spaces. For example, a client operating in a System z and z/OS is only permitted to allow a maximum of 65,536 devices online because the system requires that each device have an address with a unique 4-digit device number. The numbering space comprising the 65,536 device numbers (0000x-FFFFx) is known as a subchannel set. In System z, subchannels are firmware representations for the devices. Subchannels are needed to track state information, measurements, and the like. In an example where a large number of source devices are to be migrated (for example 40,000 devices), the migration will have to be performed in stages because a client cannot define an additional 40,000 devices that would serve as targets of the migration because the system is limited to 65,536 devices. These target devices may need to temporarily reside in an alternate numbering space in order to complete the migration. In an embodiment, a first set of devices can be mapped to a subchannel set and a second set of devices can be mapped to another subchannel set. In an example, the first set of devices can be source devices and the second set of devices can be a target set of devices. In a different embodiment, the UCBs are associated with the channel subsystem's subchannels. In one or more embodiments of the invention, alternate subchannel sets are used and allow for the additional devices to be defined. The use of the alternate subchannel set reduces the complexity of migrating large numbers of devices. After the migration is complete, the I/O configuration can be updated to reflect the target devices to be used for subsequent IPLs. As previously noted, devices may complete the migration at different times. IPLs need to be managed to ensure the correct devices are used and no data is lost.

Figure 1B:
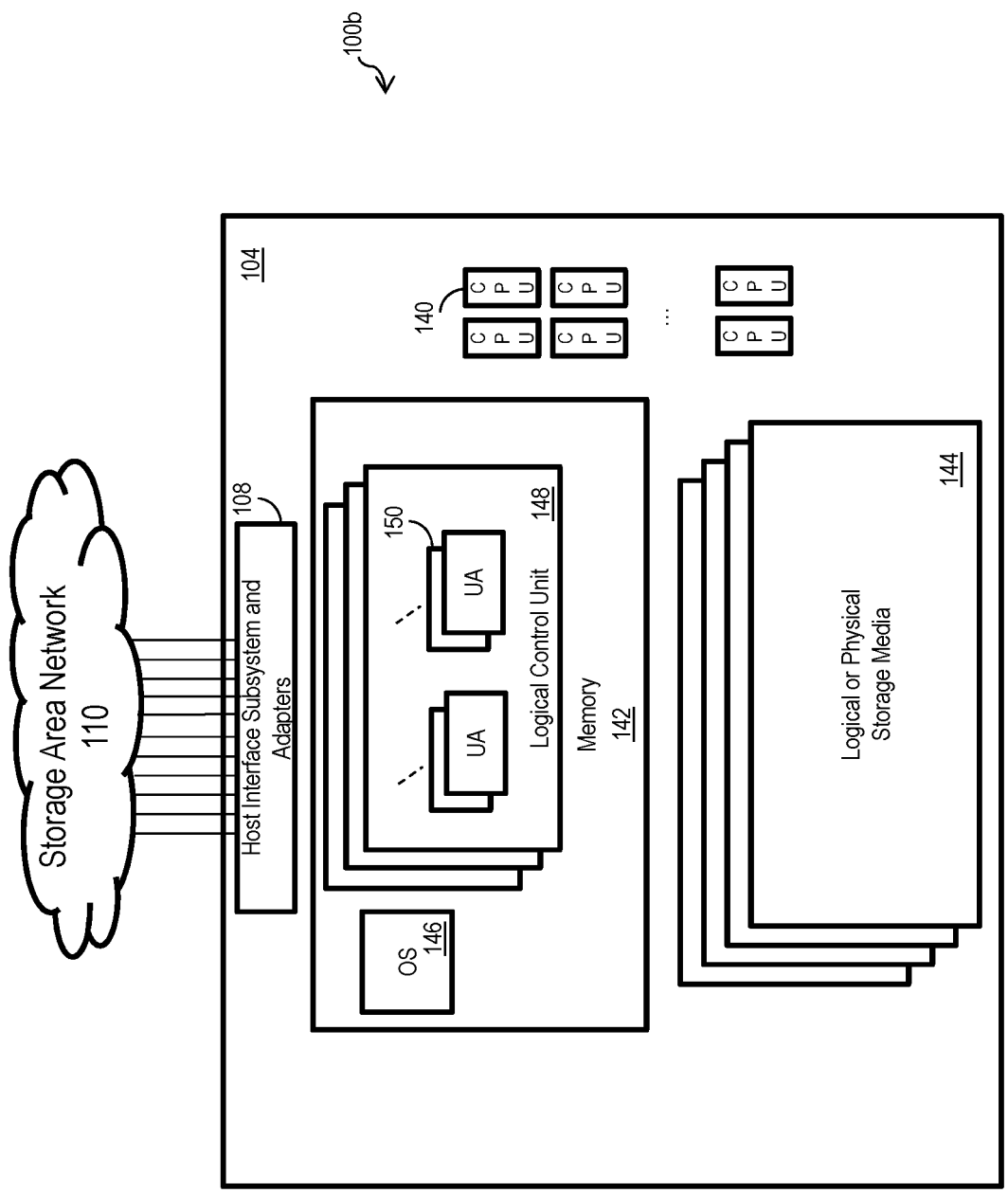

Referring to FIG. 1a, there is shown an embodiment of a portion of a computing processing system 100 including central electronics complex (CEC) 102, storage area network 110, and storage controller 104 (storage controller is shown in FIG. 1b) for implementing the teachings herein.

In this embodiment, the computing processing system 100 of FIG. 1a includes a central electronics complex (CEC) 102 comprises one or more logical partitions (LPAR) 112, central processing units (CPU) 114, and channel subsystems (CSS) 106. In one or more embodiments, each LPAR can include a memory 116 storing an operating system (OS) 118, migration software 120, and a plurality of applications (APPS) 122. In addition, memory 116 is capable of storing subchannel sets of devices in subchannel sets 124a and 124b comprising a plurality of unit control blocks (UCB) 126. In the z/OS operating system, devices are represented as unit control block (UCB) where these devices represent disc devices, tape devices, graphic devices, printers, and the like. In the CEC, devices are considered subchannels. In one or more embodiments, the OS device (UCB) is associated with a subchannel (SC).

The CSS 106 can comprise a plurality of subchannels 132 in subchannel sets 130a and 130b. In one or more embodiments, the CEC can have a multiple channel subsystems as shown in FIG. 1. The LPARs are associated with a channel subsystem (CSS). In one or more embodiments, there can be 15 LPARs in a CSS, and 6 CSSs in a CEC. Each LPAR can host an operating system and is associated with virtualized CPUs that can be dedicated or shared in some capacity.

Referring now to FIG. 1b, the storage area network 110 and storage controller 104 with other adapters, memories, and CPUs is shown. The storage controller 104 can include host interface subsystem and adapters 108, CPUs 140, memory 142, and a plurality of storage media 144. In one or more embodiments, the memory 142 can include OS 146, a plurality of logical control units 148, and unit address (UA) 150 being defined in the logical control units. In an embodiment, an application can request that an I/O be started to a device (UCB), flowing through the subchannels (SC) through the storage area network (SAN), eventually reaching the target device (UA) on the storage controller. The storage controller logical control units are defined with virtual device definitions.

The CEC of FIG. 1a and the storage controller of FIG. 1b are able to communicate through the channel subsystem 106 (CSS) and channels (CEC), or the host interface subsystem and host adapters 108 (storage controller) over the storage area network 110 (SAN). In the storage controller, devices are accessed using a logical address (control unit address, 00x to FFx), and a unit address (a number from 00x to FFx).

With reference now to FIG. 2, a flow diagram 200 of a technique for determining the correct devices to use in a mass volume migrations environment is provided. Block 202 of flow diagram 200 includes reading an I/O configuration definition for a mass volume migration environment. In one embodiment, the z/OS reads the define I/O definition file (IODF). In one or more embodiments, the I/O configuration is the set of hardware resources that are available to the operating system and the connection between these resources. The hardware resources include channels, control units, devices, switches, storage controllers, disks, volumes, and the like. The I/O configuration may define physical information and logical information for the resources. In an embodiment, the mass volume migration environment comprises a plurality of hardware resources for migrating devices from a first resource to another resource.

Block 204 provides annotating a first device and a second device of the mass volume migration environment with a status identifier, based on a migration event between the first device and the second device. In one or more embodiments, each device contains a volume serial number (VOLSER) or a label that is written at a well-defined location on the device, and the VOLSER or label can be annotated. In one embodiment, the VOLSER of a z/OS device is located at cylinder 0, track 0, block 2 of the volume. In another embodiment, the migration product or software being executed by a processor is capable of annotating the devices. In an embodiment, the logical volumes themselves are annotated while maintaining path connectivity to each device.

The annotation can include a status identifier that indicates a status of each device. The indications include an "allow online" status, a "do not allow online" status, or have no indication. Devices that are flagged "allow online" will be available for normal operation for public use and external access, and devices that are flagged "do not allow online" are to remain offline and are not accessible for public use, but are still accessible by the migration product or software. Block 206 provides verifying that the second device remains in communication with the mass migration environment. In an embodiment, the second device can be the target (destination) for the migration of a source device where a physical and/or logical connection to the second device is verified.

In order for applications to be able to use the devices, they must be varied online either by an operator or must be defined as online during IPL. When a device is brought online, the operating system reads self-description data for all paths defined to the UCB and ensures that all paths connect to the same device. If so, the paths can be grouped together using a Set Path Group ID (SPID) command. This I/O command lets an outboard controller know that the paths are grouped and further identifies the host operating system with a unique identifier. Controllers (storage controllers, tape controller, etc.) consider devices that are grouped to be online to the host operating system.

Block 208 provides reading, via an operating system, data stored on the second device, the data including the status identifier of the second device. In an embodiment, after the verification of the connection of the second device is performed, the VOLSER or label of the device can be read by an operating system. The reading can include reading the annotation of the status identifier of the device. In one or more embodiments, the z/OS reads the I/O definition file.

Block 210 provides based on a detected completion of the migration event, update the status identifier of the first device and the status identifier of the second device. In one or more embodiments, updating the device annotation may include updating the status identifier from an "allow online" status to a "do not allow online" status or vice versa.

In another embodiment, prior to the completion of the migration event, the source device status identifier is annotated or flagged as "allow online" and the target device status identifier is flagged as "do not allow online." This configuration allows the source device to be accessible for public or external use while the target device is only accessible by the migration product or software. In another embodiment, upon completion of the migration process, the source device status identifier is annotated or flagged as "do not allow online" and the target device identifier is annotated as "allow online." This configuration ensures that during a future IPL, that target device will be online and the source device will be offline.

Figure 3:
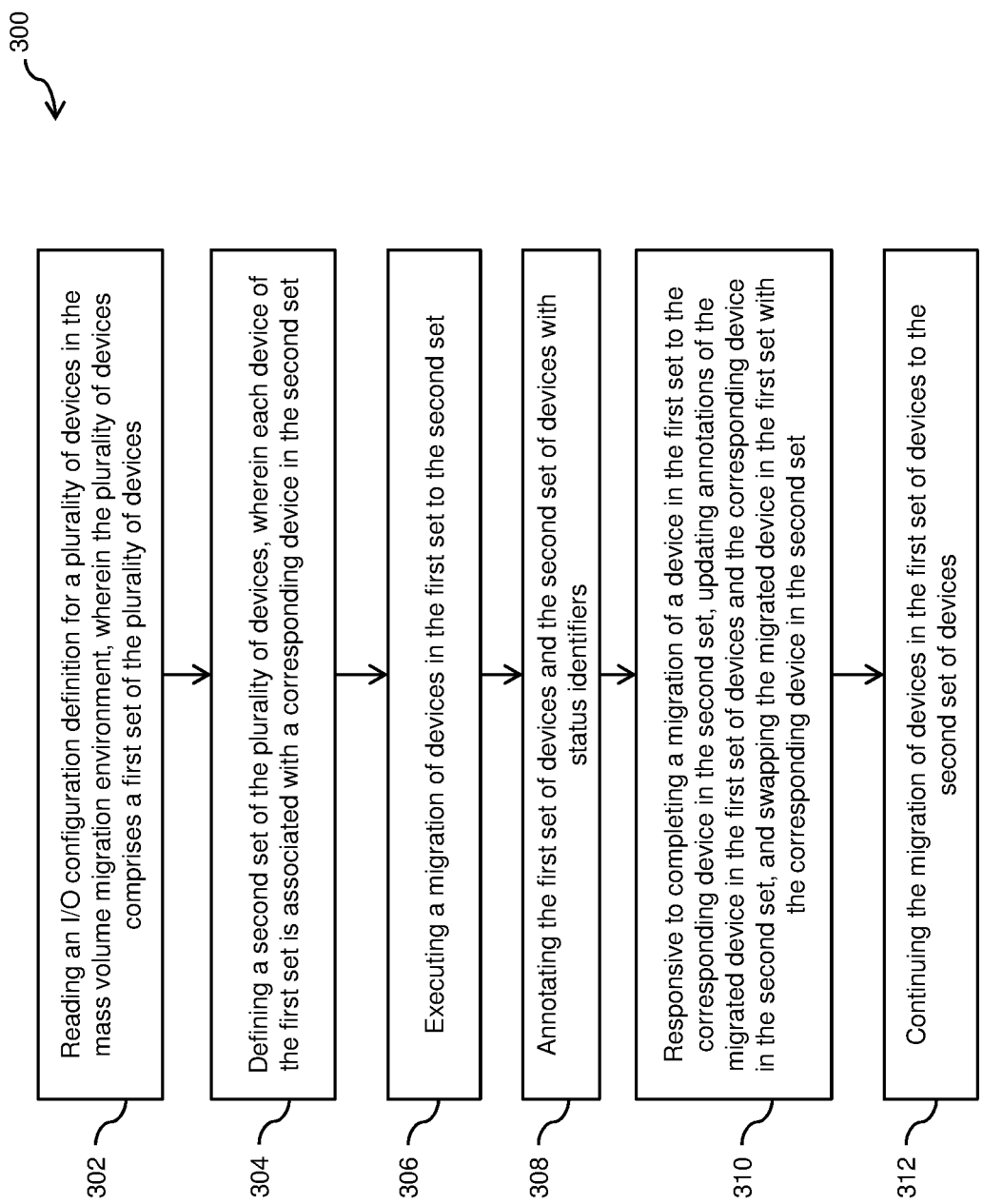
FIG. 3 illustrates a flow diagram in accordance with one or more embodiments of the invention.

Referring now to FIG. 3, there is shown a computer-implemented method 300 for determining the correct devices to use in a mass volume migration environment. Block 302 provides reading an I/O configuration definition for a plurality of devices in the mass volume migration environment, wherein the plurality of devices comprises a first set of the plurality of devices. In one or more embodiments, the reading of the I/O configuration definition occurs during initialization. In one or more embodiments, the first set and second set of devices can comprise subchannel sets. During initialization the subchannels of the system are scanned, and in one or more embodiments, the UCBs are associated with the channel subsystem's subchannels. The I/O configuration can define channels and subchannel sets of devices. Subchannel sets are part of a numbering space having unique device numbers within the numbering space. In the storage controller, devices are accessed using a logical address (control unit address, a number from 00x to FFx), and a unit address (a number from 00x to FFx). In an embodiment, the entire subchannel set is limited to 65,536 devices, and there can be one or more subchannel sets, each with 65,536 devices. At most, only 65,536 devices can be online at any given time.

Block 304 provides defining a second set of the plurality of devices, wherein each device of the first set is associated with a corresponding device in the second set. In one or more embodiments, a second alternative subchannel set is used when migrating a large number of devices where a single numbering space is not sufficient to define all of the source devices and target devices for the migration. Block 306 of FIG. 3 provides executing a migration of devices in the first set to the second set.

Block 308 provides annotating the first set of devices and the second set of devices with status identifiers. In one or more embodiments, the annotations are performed when the migration commences. In one or more embodiments, the first subchannel set of devices can be a subchannel set 0 where each device of the first subchannel set is assigned a device number 0.xxxx. A second subchannel set of devices can be a subchannel set 1 where each device of the second subchannel set is assigned a device number 1.xxxx, wherein in one or more embodiments, xxxx is the same between the device of different subchannel sets. For example, a device 1000 in subchannel set 0 can be subsequently described as 0.1000, and a device 1000 in subchannel set 1 can be subsequently described as 1.1000. Device 0.1000 can be associated with device 1.1000. As previously explained, each subchannel set can define 65,536 devices. This allows for the association between device pairs (source and target) to be defined to simplify large migrations. In one or more embodiments, a first subchannel set belongs to a first storage controller and a second subchannel set belongs to a second storage controller. In a different embodiment, the first subchannel set can belong to a plurality of storage controllers, and the second subchannel set can belong to a plurality of different storage controllers.

Block 310 provides responsive to completing a migration of a device in the first set to the corresponding device in the second set, updating the annotations of the migrated device in the first set of devices and the corresponding device in the second set, and swapping the migrated device in the first set with the corresponding device in the second set. In one or more embodiments, upon the completion of the migration the device of the source subchannel set can be flagged as "do not allow online" and the associated corresponding device of the target subchannel set can be flagged as "allow online." In one or more embodiments, the source devices will be swapped with the corresponding target devices upon the completion of the migration to the target device, so when the I/O application is resumed the application I/O will flow to the target device in the second subchannel set. The target devices will be brought online due to the swap.

Block 312 provides continuing the migration of the devices of the first set of devices to the second set of devices. In one or more embodiments, as each device completes migration, the annotations will be updated and the remainder of the non-migrated devices will continue to be migrated. A hybrid set of migrated devices and non-migrated devices are allowed to remain online until the non-migrated devices have completed the migration process.

Figure 4:
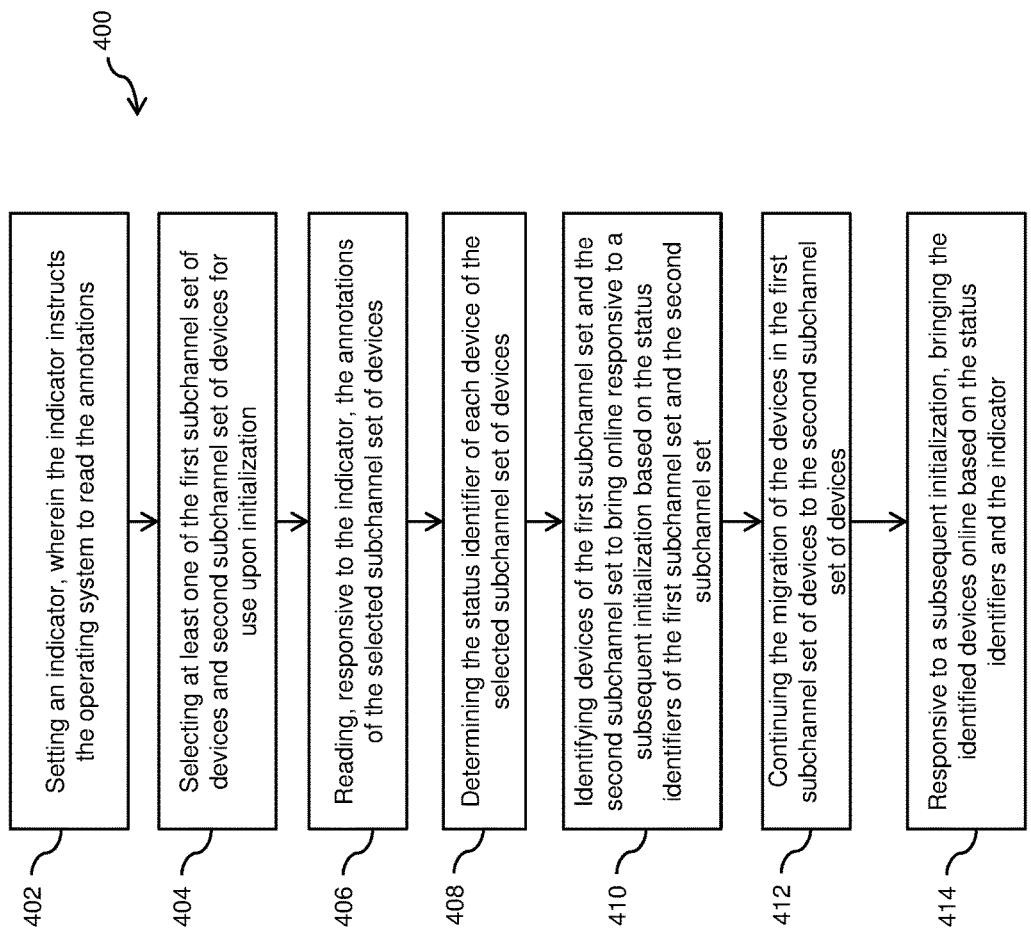
FIG. 4 illustrates a flow diagram in accordance with one or more embodiments.

Now referring to FIG. 4, a flow diagram 400 for a computer-implemented method for determining correct devices to use in a mass volume migration environment.

Block 402 provides setting an indicator, the indicator instructs the operating system to read the annotations. In one or more embodiments, an indicator for IPL to observe the annotations can be set. In the event the indicator is not set, the operating system will default to using the devices in the selected subchannel set. When the indicator is set, the operating system will be instructed to read the annotations and use the appropriate devices based on the status indicator in the annotation.

Block 404 provides selecting at least one of the first subchannel set of devices and second subchannel set of devices for use upon initialization. In one or more embodiments, a selection can be selected among multiple subchannel sets of devices. In one or more embodiments, the z/OS can read a file that describes the subchannel set to be used. In another embodiment, the subchannel set can be selected as a parameter on a graphical user interface (GUI). In one or more embodiments, the initialization or subsequent initialization, such as an IPL, can occur after the device migration is completed where the devices of the selected subchannel set will be brought online. The selection may occur automatically or may be manually selected by a client or operator.

Block 406 provides reading, responsive to the indicator, the annotations of the selected subchannel set of devices. In one or more embodiments, the indicator will instruct the operating system to read the annotations of the selected subchannel set or the indicator will instruct the operating system to ignore the annotations of the selected subchannel set. Block 408 provides determining the status identifier of each device of the selected subchannel set of devices. In an embodiment, based on the indicator, an operating system reads the annotations of each of device in the selected subchannel set of devices where each of the annotations is stored individually on each device.

Block 410 provides identifying devices of the first subchannel set and the second subchannel set to bring online responsive to a subsequent initialization based on the status identifiers of the first subchannel set and the second subchannel set. In one or more embodiments, for devices of the selected subchannel set that are annotated as "do not allow online" status, the device of the non-selected subchannel set will be accessed by a requesting client. In our embodiment, z/OS has the concept of bring the system up with devices offline, and later, operations or automation can vary devices online. During vary online, processing, these annotations also must be observed. In one or more embodiments, when a client wishes to access a device of the selected subchannel set and the device is in the "do not allow online" state, the system will access the associated corresponding device of the non-selected subchannel set without the knowledge of the client to provide the requested data or to complete the requested transaction. In one or more embodiments, the non-selected subchannel set includes a subchannel set of devices that is the source for migration which has a connection to the mass volume migration environment. For example, if a subchannel set 1 device is selected and a 1.1000 device has a status identifier as "do not allow online," the 0.1000 device of the non-selected subchannel set 0 will be accessed by applications desiring access to data on the 1.1000 device. Devices can be swapped during initialization time, vary online time, or upon the completion of migration. After the swap, the devices are online.

This approach allows for a hybrid set of devices (migrated and non-migrated devices) from different subchannel sets to accommodate various migration completions. Various migration completions can occur due to different amounts of data to be transferred, the equipment used, the transfer rates, and other similar factors.

This approach allows the migration product to identify which devices are to be used by the operating system for IPL. Once all devices in the target subchannel set have completed the migration, all of the 1.xxxx devices will be flagged as "allow online" and all of the 0.xxxx devices with 1.xxxx pairs will be flagged as "offline." In one or more embodiments, the system programmer can subsequently update the I/O configuration so that the target devices become the device moved into the first subchannel set, and the old source device can be removed from the I/O configuration, and the IPL indicator can be changed to indicate that annotations can be ignored. This simplifies the system programmer's task of managing interim I/O configurations with unnecessary changes.

Block 412 provides the continuing of the migration of the first subchannel set of devices to the second subchannel set of devices. In one or more embodiments, the migration process will continue due to the varying times that each device completes its migration. The remaining non-migrated devices will continue the migration. Upon the completion of the migrations the devices will be swapped to the target devices based on the status identifiers.

Block 414 provides responsive to a subsequent initialization, bring the identified devices online based on the status identifiers and the indicator. In one or more embodiments, after the completion of the migration and the swapping of the devices from the source subchannel set to the target subchannel set, the identified devices will be brought online after a subsequent IPL.

Referring now to FIG. 5, a table 500 depicting devices and status identifier information is shown. The table 500 depicts a primary subchannel set of device having an address 0.xxxx in cell 502 and a secondary subchannel set of device having an address 1.xxxx in cell 504. Initially, prior to migration, the devices are not flagged to indicate whether devices are allowed online and/or are to remain offline. Row 508 of table 500 illustrates the status of a device of subchannel 0 in column 502 and an associated device in subchannel 1 in column 504. Column 506 indicates which subchannel set is to be brought online. In an embodiment, row 508 provides that the 1.xxxx would be brought online if subchannel set 1 was indicated as the IPL set. If subchannel set 0 was indicated as the IPL set, 0.xxxx would be brought online. If the system performs an IPL indicating that the devices in subchannel set 1 are to be used, 1.xxxx would be online.

In one or more embodiments, at the beginning of the migration, the devices of the source subchannel set are marked as "allow online" and the target subchannel set of devices are marked as "do not allow online." Devices that are not allowed online can only be accessed by the migration product or software. These offline devices are not available for public use. However devices that are allowed online are accessible and available to the client for normal operation.

Row 510 depicts the annotations of the source and target devices after the migration software annotations at the beginning of the migration process. In an embodiment, after a client has conducted an IPL using devices in subchannel set 0, the migration begins by performing the annotations as described in 510. If an IPL is required after the annotations have been completed, the client would then IPL using the device in subchannel set 1, and they would indicate that the annotations should be used to determine the proper devices to bring online. For example, the subchannel set 0 device is the primary source device and will be migrated to the subchannel 1 device, the secondary target device. The device of subchannel 0 is annotated as "allow online" and the device of subchannel 1 as "do not allow online." The device that is brought online is the source device, and the target device, although in an offline mode, is accessible by the migration product or software and not by a client. The primary devices are brought online at this stage because the secondary devices have not completed the migration process.

Row 512 of table 500 provides the annotations for the primary source device and a secondary target device after the migration of the device has been completed. The source device is annotated as "do not allow online" and the target device is annotated as "allow online." The annotations for the source device and the associated target device are switched upon the completion of the migration.

Row 514 illustrates a condition where the source and the target devices are in a "do not allow online" status, and no devices will be brought online because this is an error condition. An application that is attempting to access either the source or target device will be unsuccessful. Row 516 of table 500 also illustrates a condition where the source and target devices are in an error condition. When the source and target device are in the "allow online" state, an application attempting to access the source or target device will return an error. In one more embodiments the table 500 represents the status of each device and how each device has been annotated. In one or more embodiments, there is no separate table to manage the annotations and status information of each device. In one or more embodiments, an override will allow the operating system to ignore the annotations setting at IPL and have the client identify which devices or subchannel sets to use should be explicitly used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for determining which devices to use in a mass volume migration environment, said computer program product comprising:
    a computer readable storage medium having stored thereon program instructions executable by a processor to cause the processor to:
    read an I/O configuration definition for a plurality of devices in the mass volume migration environment, wherein the plurality of devices comprise a first set of the plurality of devices;
    define a second set of the plurality of devices, wherein each device of the first set is associated with a corresponding device in the second set;
    execute a migration from the first set to the second set;
    annotate the first set of devices and the second set of devices with status identifiers;
    responsive to completing a migration of a device in the first set to the associated corresponding device in the second set, update annotations of the migrated device in the first set and the corresponding device in the second set and swap the migrated device in the first set with the corresponding device in the second set;
    continue the migration of the devices of the first set of devices to the second set of devices, wherein the first set of devices is associated with a first subchannel set of devices and the second set of devices is associated with a second subchannel set of devices;
    wherein updating the annotations comprises switching a status identifier of a device of the first subchannel set with a status identifier of an associated device of the second subchannel set;
    set an indicator, wherein the indicator instructs an operating system to read the annotation;
    select at least one of the first subchannel set of devices and second subchannel set of devices for use upon initialization;
    read, responsive to the indicator, the annotation of the selected subchannel set of devices;

determine the status identifier of each device of the selected subchannel set of devices;

identify devices of the first subchannel set and the second subchannel set to bring online responsive to a subsequent initialization based on the status identifiers of the first subchannel set and the second subchannel set; and continue the migration of devices in the first subchannel set of devices to the second subchannel set of devices.

2. The computer program product of claim 1, wherein the annotations comprise a status identifier indicating at least one of an "allow online" status and a "do not allow online" status.

3. The computer program product of claim 1, wherein the program instructions are further executable by the processor to cause the processor to:

ignore the selection based on the indicator; and allow a client to expressly select devices or subchannel sets for use.

4. The computer program product of claim 1, wherein the program instructions are further executable by the processor to cause the processor to:

responsive to a subsequent initialization, identify the devices to bring online based on the status identifiers and the indicator.

5. A computer-implemented method for determining which devices to use in a mass volume migration environment, the method comprising:

reading an I/O configuration definition for a plurality of devices in the mass volume migration environment, wherein the plurality of devices comprise a first set of the plurality of devices;

defining a second set of the plurality of devices, wherein each device of the first set is associated with a device in the second set;

annotating the first set of devices and the second set of devices with status identifiers;

executing a migration from the first set to the second set;

responsive to completing a migration of a device in the first set to the associated device in the second set, updating an annotation of the migrated device in the first set and the associated device in the second set;

continuing the migration of devices in the first set of devices to the second set of devices, wherein the first set of devices is associated with a first subchannel set of devices and the second set of device is associated with a second subchannel set of devices;

wherein updating the annotation comprises switching a status identifier of a device of the first subchannel set with a status identifier of an associated device of the second subchannel set;

selecting at least one of the first subchannel set of devices and second subchannel set of devices for use upon initialization;

setting an indicator, wherein the indicator instructs an operating system to read the annotation;

reading, responsive to the indicator, the annotations of the selected subchannel set of devices;

determining the status identifier of each device of the selected subchannel set of devices;

identifying devices of the first subchannel set and the second subchannel set to bring online responsive to a subsequent initialization based on the status identifiers of the first subchannel set and the second subchannel set; and continuing the migration of the first subchannel set of devices to the second subchannel set of devices.

6. The method of claim 5, wherein the annotation comprises a status identifier indicating at least one of an "allow online" status and a "do not allow online" status.

7. The method of claim 5, further comprising:

ignoring the selection based on the indicator; and allowing a client to expressly select devices or subchannel sets for use.

8. A system for determining which devices to use in a mass volume migration environment, the system comprising:

an operating system configured to read an I/O configuration definition for a plurality of devices, wherein the plurality of devices comprises a first set of the plurality of devices;

a processor configured to define a second set of the plurality of devices, wherein each device of the first set is associated with a device in the second set; and a migration product configured to:

annotate the first set of devices and the second set of devices with status identifiers;

execute a migration from the first set to the second set;

responsive to completing a migration of a device in the first set to the associated device in the second set, update annotations of the migrated device in the first set and the associated device in the second set;

continue the migration of the first set of devices to the second set of devices;

wherein the first set of devices is associated with a first subchannel set of devices and the second set of devices is associated with a second subchannel set of devices;

wherein the migration product is further configured to select at least one of the first subchannel set of devices and the second subchannel set of devices for use upon initialization;

wherein the migration product is further configured to:

set an indicator, wherein the indicator instructs the operating system to read the annotation;

read, responsive to the indicator, the annotation of the selected subchannel set of devices;

determine the status identifier of each device of the selected subchannel set of devices;

identify devices of the first subchannel set and the second subchannel set to bring online responsive to a subsequent initialization based on the status identifiers of the first subchannel set and the second subchannel set; and continue the migration of devices in the first subchannel set of devices to the second subchannel set of devices.

9. The system of claim 8, wherein the annotations comprise a status identifier indicating at least one of an "allowed online" status and a "do not allow online" status.

10. The system of claim 8, wherein the migration product is further configured to:

ignore the selection based on the indicator; and allow a client to expressly select devices or subchannel sets for use.

* * * * *